(12) United States Patent
Parenteau

(10) Patent No.: US 6,763,965 B2
(45) Date of Patent: Jul. 20, 2004

(54) APPARATUS AND METHOD FOR LIFTING AND SUPPORTING A UTENSIL COVER

(76) Inventor: Christopher Eugene Parenteau, 19420 Fenway Ave. North, Forest Lake, MN (US) 55025

( * ) Notice: Subject to any disclaimer, the term of this patent is extended or adjusted under 35 U.S.C. 154(b) by 22 days.

(21) Appl. No.: 10/322,016

(22) Filed: Dec. 17, 2002

(65) Prior Publication Data

US 2004/0113032 A1 Jun. 17, 2004

(51) Int. Cl.[7] .............................................. B65D 43/26
(52) U.S. Cl. ....................... 220/263; 99/340; 248/213.2
(58) Field of Search ................................ 220/263, 262, 220/845, 846, 546, 908, 912, 573, 315, 212; 99/407, 409, 410, 336, 340, 483; 248/213.2, 213.1

(56) References Cited

U.S. PATENT DOCUMENTS

| | | | | |
|---|---|---|---|---|
| 2,862,683 A | * | 12/1958 | Dunagan et al. ............ | 248/147 |
| 3,719,305 A | * | 3/1973 | Pressnell .................... | 220/740 |
| 3,885,700 A | * | 5/1975 | Allard ........................ | 220/263 |
| 4,025,206 A | | 5/1977 | Rubin | |
| 4,313,612 A | * | 2/1982 | Rubens ...................... | 280/79.5 |
| 4,375,711 A | | 3/1983 | Franzen et al. | |
| 4,450,757 A | * | 5/1984 | Alfio .......................... | 99/327 |
| 4,823,975 A | * | 4/1989 | Schwankl .................. | 220/740 |
| 4,921,119 A | * | 5/1990 | Goad et al. ................ | 220/212 |
| 4,957,039 A | * | 9/1990 | Reyes ........................ | 99/340 |
| 5,247,877 A | * | 9/1993 | Beard et al. ............... | 99/446 |
| 5,553,531 A | * | 9/1996 | Brown ........................ | 99/340 |
| 5,683,010 A | | 11/1997 | Boyajian, Jr. | |
| D401,114 S | * | 11/1998 | Reed ........................... | D7/511 |
| 5,857,660 A | * | 1/1999 | Lentine ...................... | 248/640 |
| 6,361,004 B1 | | 3/2002 | Witherspoon | |

FOREIGN PATENT DOCUMENTS

| | | |
|---|---|---|
| DE | 296 05 192 U1 | 5/1996 |
| JP | 7023864 | 1/1995 |

* cited by examiner

*Primary Examiner*—Lien Ngo
(74) *Attorney, Agent, or Firm*—Michael A. Mochinski

(57) ABSTRACT

A utensil cover lift and support apparatus made adaptable for use with a cooking and food serving utensil generally comprising a cover having a handle extending upwardly therefrom, the lift and support assembly comprising a support fork assembly having a latch mechanism pivotally attached to a pair of elongate arms each being configurably arranged to engage a portion of the cover's handle and a vertical support member selectively situated in between the two elongate arms and pivotally connected thereto and having an adjustable support block slidably connected thereto for engaging an outer lip made part of the cooking and food serving utensil and at least one strap of continuous structure to circumferentially engage the sidewalls of the cooking and food serving utensil, collectively serving to secure the utensil cover lift and support apparatus to the cooking and food serving utensil insofar to assist in achieving the desirable objective of lifting and supporting the cover to gain momentary access to comestible contents residing within the cooking and food serving utensil for completion of tasks of food preparation and service.

20 Claims, 8 Drawing Sheets

US 6,763,965 B2

APPARATUS AND METHOD FOR LIFTING AND SUPPORTING A UTENSIL COVER

FIELD OF THE INVENTION

The present invention relates in general to an apparatus made adaptable for use in lifting and supporting a cover typically made part of a combination cooking and food serving utensil such as a crock pot of the type commonly known in the art. More specifically, the present invention serves as means to efficiently and safely lift and support the cover from and over the cooking and food serving utensil in order to gain momentary access to comestible contents situated therein.

BACKGROUND OF THE INVENTION

Many homemakers as well as chefs utilize various utensils and appliances in the kitchen to assist in the preparation and service of food. A crock pot of the type commonly known in the art is an example of a combination kitchen utensil which purposefully cooks and warms food at a low temperature for a predetermined period of time. Given its desired capacity to slow cook and warm a modest amount of food, the crock pot is most notably used and observed at large gatherings, such as conferences, family meetings and so forth. To facilitate the cooking process and guard against heat-related injuries stemming from splattered foods, most cooking and food serving utensils comprise a top or cover made from glass or a semi-conductive material. The utensil cover, in most instances, is heavily weighted insofar to fit tightly atop a cylindrical-shaped, heat-equipped reservoir and is geometrically configured to resemble a dome or semi-flatten plate having a handle outwardly extending therefrom and integrally made part thereof.

During the cooking process as well as during moments of serving food, the homemaker or chef is periodically confronted with the requirement of removing the cover from the cooking and food serving utensil and locating a suitable location for the cover while one is gaining momentary access to the comestible contents. In order to alleviate this concern most effectively, the art provides for a range of cover handling devices. The most simplistic device comprises a pot handling glove or pad having insulating characteristics, while the more advanced device comprises a pot and pan lid holder of the type that can simultaneously engage the cover's handle and sidewall of the cooking utensil, such as the one described in U.S. Pat. No. 5,683,010 issued to Boyajian, Jr. Although this type of handling device still requires one to directly interact with and handle the cover, albeit at a modest level, it does facilitate placement of the cover about the utensil sidewall, thus suitably serving as a location for the cover.

In accordance with the present invention, applicant has appreciably devised an apparatus comprising means for lifting a cover while at rest atop the cooking and food serving utensil and supporting the cover at an inclined position for a momentary period of time insofar to gain access to the comestible contents, all of which can be accomplished without direct contact with the utensil cover.

BRIEF SUMMARY OF THE INVENTION

In order to overcome the numerous drawbacks apparent in the prior art, a utensil cover lift and support apparatus has been devised for use in residential and commercial food preparation and service settings.

It is thus an object of the present invention to provide a low cost, non-complicated utensil cover lift and support apparatus which may be reliably used in food preparation and service settings without undue modification of the cooking and food serving utensil.

It is another object of the present invention to provide such a utensil cover lift and support apparatus which affords one to access to the comestible contents in the cooking and food serving utensil without substantial interaction with and direct handling of the cover.

It is yet another object of the present invention to provide such a utensil cover lift and support apparatus which is capable of being washed and cleaned to the likes of other cooking utensils often used in a kitchen setting.

It is another object of the present invention to provide such a utensil cover lift and support apparatus which possesses the capacity to conform to a variety of cooking and food serving utensil shapes and configurations.

It is yet another object of the present invention to provide such a utensil cover lift and support apparatus which permits the return of condensed comestible contents collected on the cover back into the cooking and food serving utensil.

It is yet another object of the present invention to provide such a utensil cover lift and support apparatus which incorporates detachable means for easy removal from the cooking and food serving utensil.

It is yet another object of the present invention to provide such a utensil cover lift and support apparatus which accomplishes the foregoing and other objects and advantages and which is economical, durable, and fully effective in performing its intended functions.

In accordance with the present invention, a utensil cover lift and support apparatus has been devised for use in a food preparation and service setting, the utensil cover lift and support apparatus comprising in combination a support fork assembly having a latch mechanism pivotally attached to a pair of elongate arms each being configured to engage a portion of a handle generally made part of a cover of a cooking and food serving utensil and a vertical support member selectively situated in between the two elongate arms and pivotally connected to an end thereof and having an adjustable support block slidably connected thereto for engaging an outer lip made part of the cooking and food serving utensil and at least one strap of continuous structure to circumferentially engage the sidewall of the cooking and food serving utensil, collectively serving to secure the utensil cover lift and support apparatus to the cooking and food serving utensil to assist in achieving the desireble objective of lifting and supporting the cover to gain momentary access to comestible contents residing within the cooking and food serving utensil for completion of tasks of food preparation and service.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as an apparatus for lifting a cover from a cooking and food serving utensil while at rest thereon in order to gain access to comestible contents residing therein and supporting the cover for a momentary period of time until which time the cooking or serving task is complete.

Figure 1:
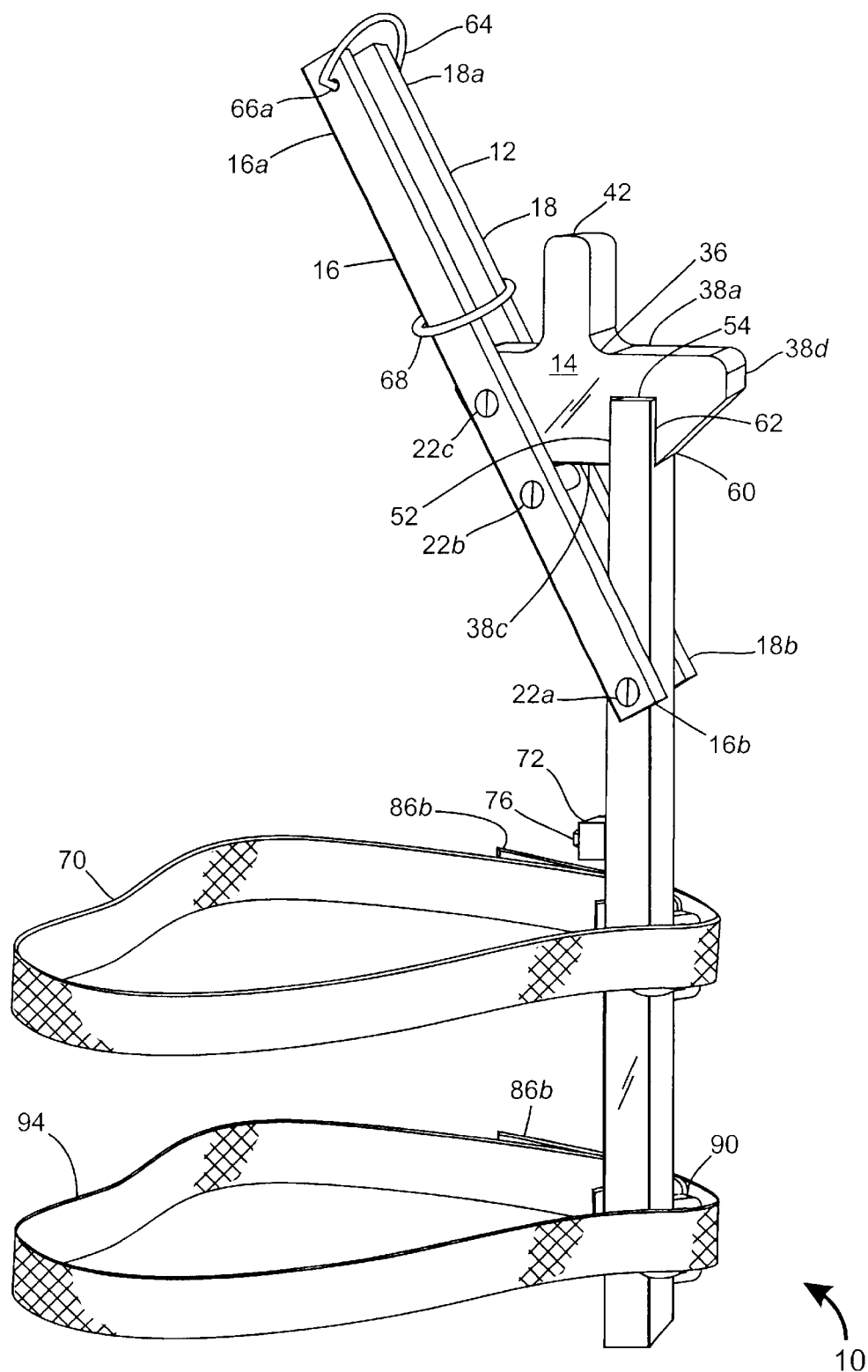
FIG. 1 is a side perspective view of the preferred embodiment of the present invention illustrating a latch mechanism engaging a top end of a vertical support member.
Figure 2:
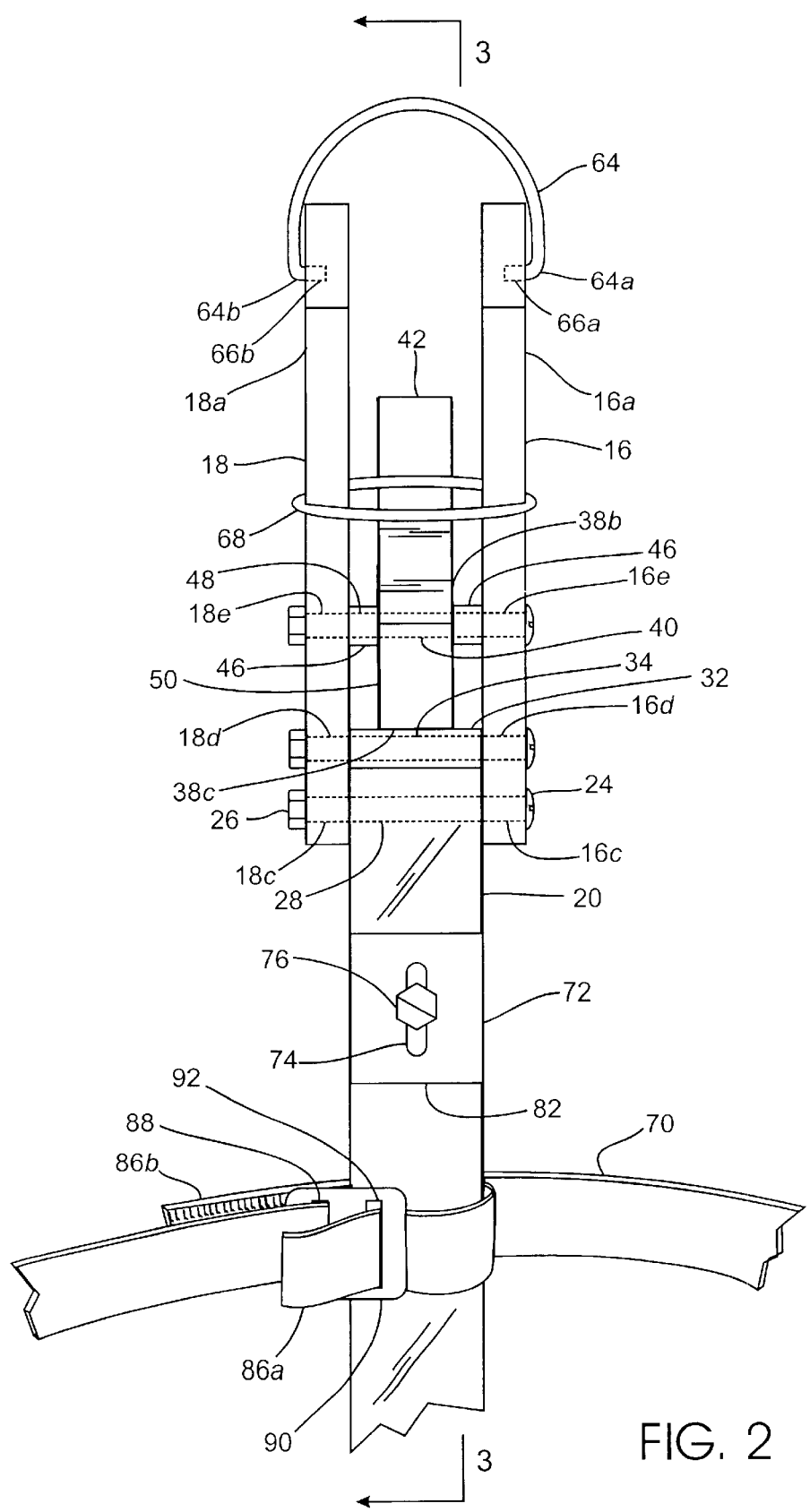
FIG. 2 is a partial front elevational view of the preferred embodiment of the present invention illustrating a fork support assembly in an upright position and engaging a top end of a vertical support member.
Figure 3:
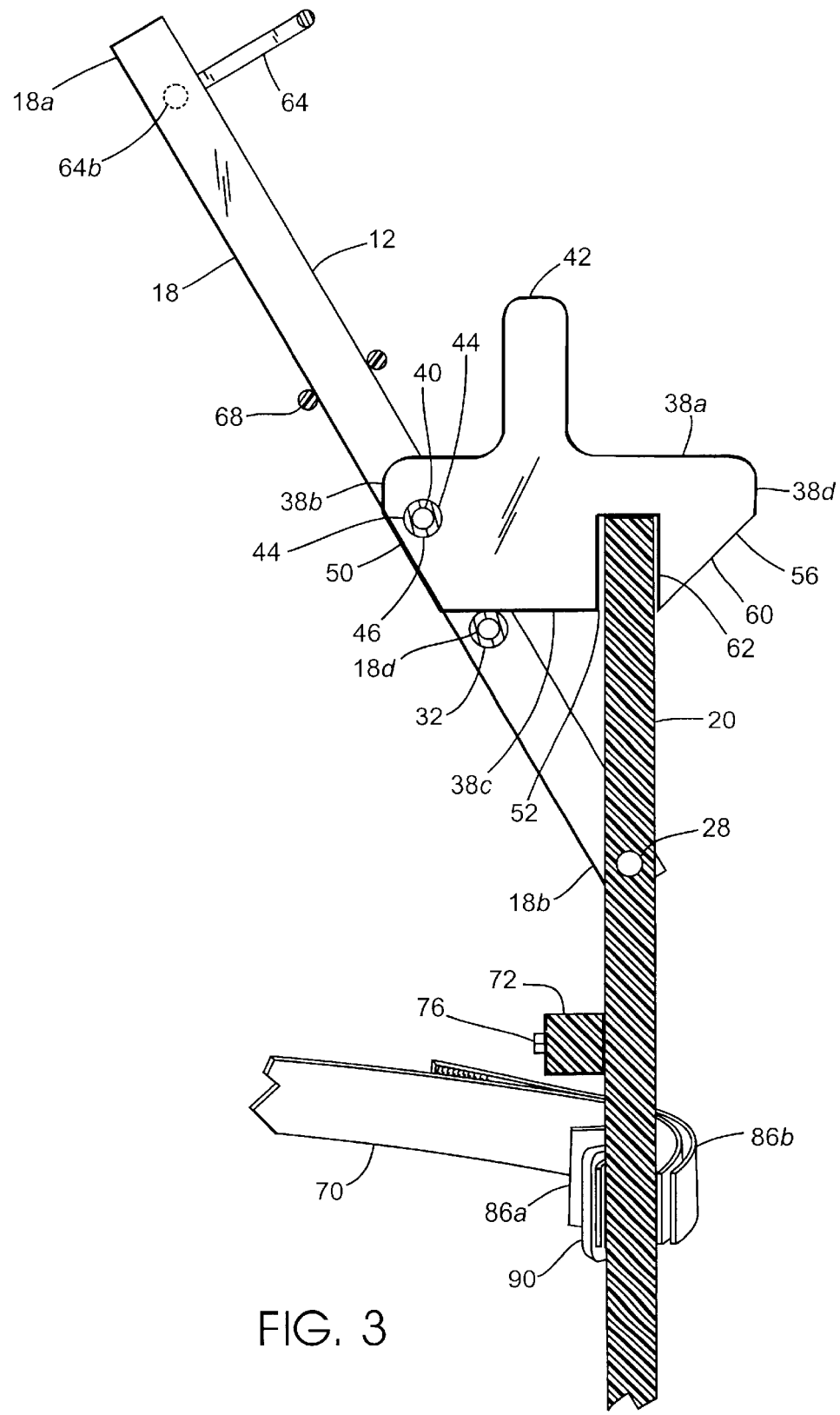
FIG. 3 is a side cross sectional view of the preferred embodiment of the present invention taken on line 3—3 of FIG. 2 illustrating a fork support assembly in an upright position and engaging a top end of a vertical support member.
Figure 4:
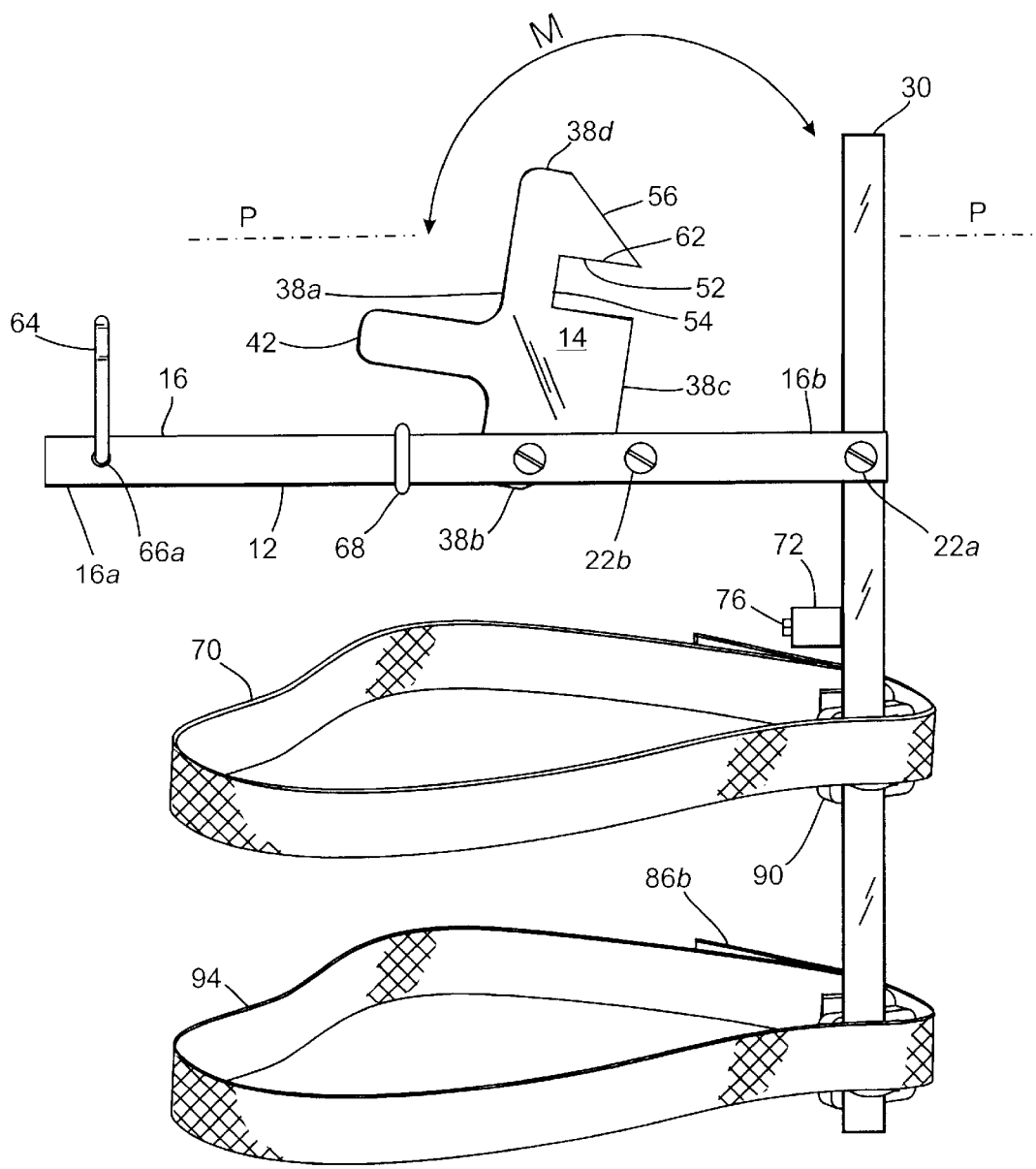
FIG. 4 is a side elevational view of the preferred embodiment of the present invention illustrating a latch mechanism disengaged from a vertical support member and a pair of elongate arms extending horizontal and parallel to axis P.

Referring now to FIG. 1, there is shown generally at 10 a utensil cover lift and support apparatus comprising a support fork assembly 12 having a latch mechanism 14 and a pair of elongate arms 16, 18 each being pivotally fastened to a vertical support member 20 and engaging a portion of the latch mechanism. In the preferred embodiment, each elongate arm 16, 18 comprises first and second ends 16a, 18a, 16b, 18b and at least three apertures (referred hereinafter as primary 16c, 18c, secondary 16d, 18d and tertiary 16e, 18e apertures) extending therethrough to permit passage of an equivalent number of fasteners 22a, 22b, 22c for holding together the elongate arms in a parallel arrangement and supporting the latch mechanism 14. Preferably, each fastener comprises a bolt 24 having a nut 26 threadably attached thereto which collectively serve to simplify construction of the support fork assembly. Although not explicitly stated herein, other fasteners of the type commonly known in the art may equally accomplish the same objective of holding together the elongate arms, such as an equivalent number of rivets by way of example. The primary aperture 16c, 18c of each elongate arm 16, 18 is preferably positioned at the second end 16b, 18b and primarily serves as the location for fastening each of the elongate arms to the vertical support member 20. As shown in FIGS. 2 and 3, the vertical support member comprises an aperture 28 having an equivalent diameter to that of the primary aperture and is positionally aligned therewith to permit passage of one of three bolts 22a used in the support fork assembly 12. Preferably, the vertical support member's aperture is located approximately one-third the distance from a top end 30 of the vertical support member in order to allow freedom of movement as the latch mechanism moves along path M, as shown in FIG. 4.

Referring now to FIGS. 2 and 3, the support fork assembly 12 further comprises an arm spacer 32 having a bore 34 extending lengthwise thereabout, with the bore having a diameter substantially equivalent to the diameter of the secondary aperture 16d, 18d of the elongate arm 16, 18. The arm spacer most notably assists in retaining the parallel positioning of each of the elongate arms 16, 18 and acts as a brace and catch for resting thereon a portion of the latch mechanism 14 while the latch mechanism is pivotally positioned away from the top end 30 of the vertical support member. In assembled form, the bore 34 of the arm spacer 32 will be configurably positioned perpendicular to the latch mechanism and elongate arms and aligned with the secondary aperture 16d, 18d of each of the elongate arms to permit passage of a second fastener 22b of the three used for the support fork assembly 12, as best illustrated in FIG. 2.

Figure 5:
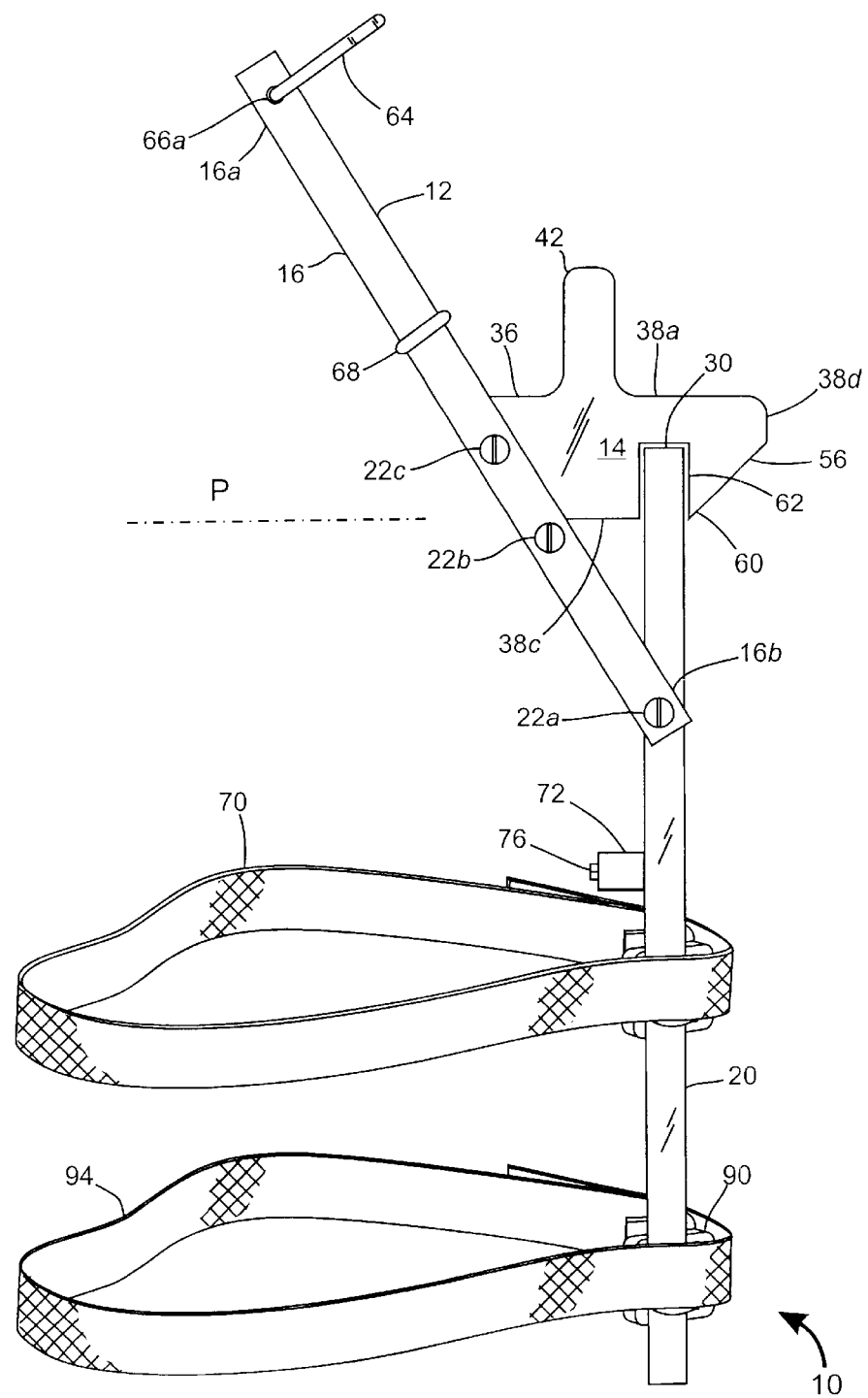
FIG. 5 is a side elevational view of the preferred embodiment of the present invention illustrating a fork support assembly in an upright position and engaging a top end of a vertical support member.
Figure 6:
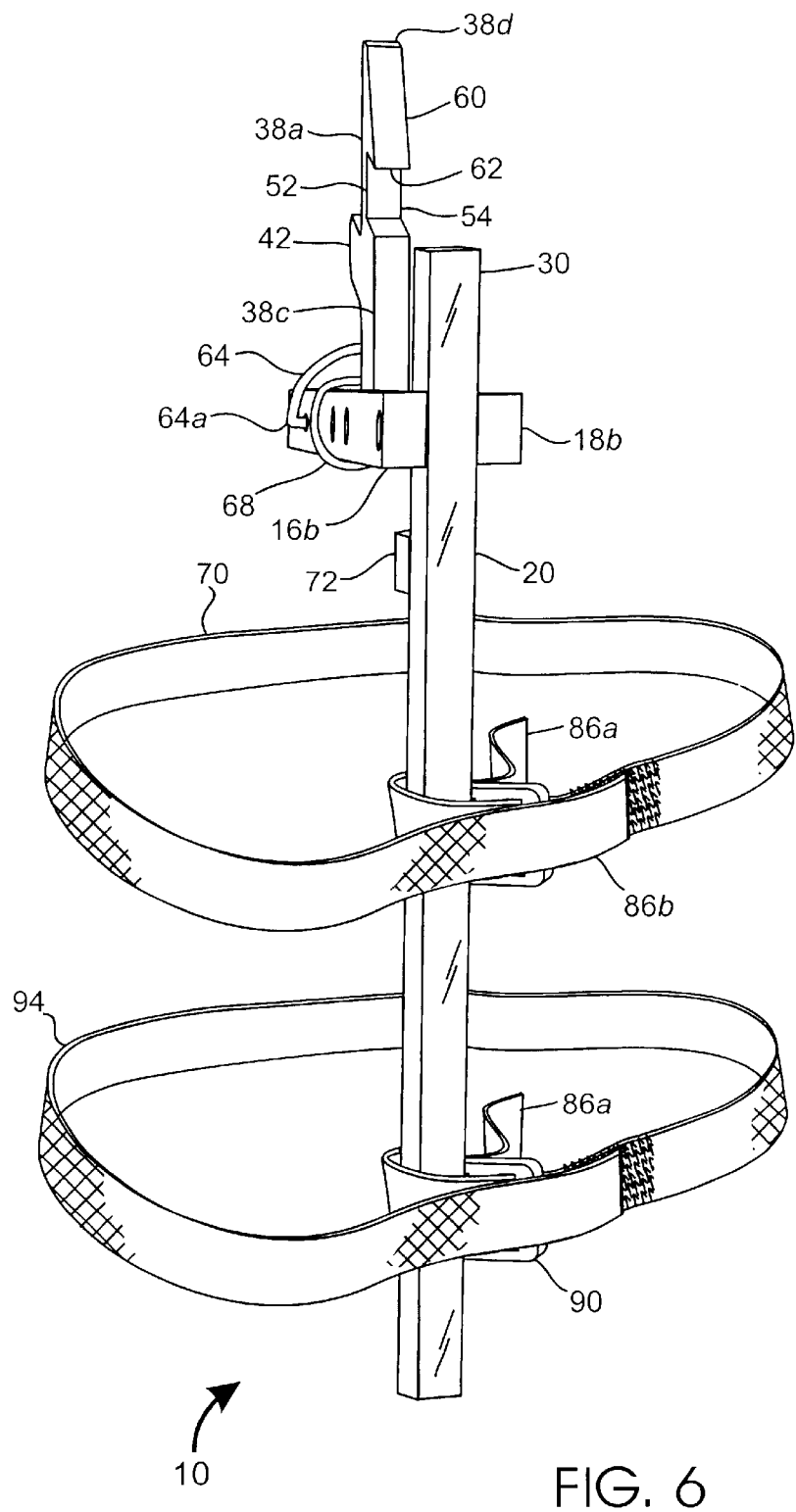
FIG. 6 is a back perspective view of the preferred embodiment of the present invention illustrating a support fork assembly in a horizontal position.

The latch mechanism, as shown in FIG. 3, comprises a flatten plate 36 having four sides 38a, 38b, 38c, 38d and an aperture 40 extending therethrough for receiving a third fastener 22c of the three used for the support fork assembly 12. In the preferred embodiment, the first side 38a comprises a handle 42 extending outwardly therefrom in a perpendicular fashion and primarily serves as means to swing back-and-forth the latch mechanism 14 about a pivot point 44 primarily established at the aperture 40 located at and near the second side 38b. To maintain central positioning of the latch mechanism about the vertical support member 20 and in between the elongate arms to prevent frictional engagement therewith, the pivot point 44 comprises a pair of latch spacers 46 each having an elongate bore 48 extending lengthwise thereabout. As shown in FIG. 2, each arm spacer is adaptably fitted perpendicular to each side of the latch mechanism at and near the pivot point and positionally aligned with the latch mechanism's aperture 40 and the tertiary aperture 16e, 18e of each of the elongate arms 16, 18 insofar to permit passage of the third fastener 22c and establish the means by which the latch mechanism swingably moves and pivots about the pivot point 44. Located at and along the second side 38b of the latch mechanism is an angular edge 50 commencing at and near the aperture 40 and terminating at the third side 38c of the flatten plate 36, as best depicted in FIG. 5. The angular edge is geometrically configured to allow the latch mechanism to clear the arm spacer 32 for pivotal movement thereof and prevent the cover of the cooking and food serving utensil from interfering with the functioning of the latch mechanism 14, particularly during activities of lifting and supporting. The third side 38c of the latch mechanism comprises a cutout 52 having an abutting end 54 and a geometric configuration substantially corresponding to that of the top end 30 of the vertical support member 20, namely one that is rectangular in shape but proportionally sized to permit the first and second sides 38a, 38c of the latch mechanism to be substantially positioned parallel to a horizontal axis P, as illustrated in FIG. 5. Preferably upon engaging the latch mechanism 14 with that of the vertical support member, the abutting end 54 will substantially mate with the top end, with the handle 42 being upwardly extended, generally in parallel alignment with the longitudinal axis of the vertical support member 20. This positioning is most notably apparent during use of the utensil cover lift and support apparatus 10 whereby the cover of the cooking and food serving utensil and elongate arms are collectively positioned at an incline, approximately 45° to the horizontal axis P as noted in FIG. 5. Conversely, the latch mechanism 14 upon release from the top end 30 will principally position the elongate arms 16, 18 in a perpendicular arrangement with that of the vertical support member 20, with the handle being outwardly positioned to extend away therefrom, as shown in FIG. 6. Similar to the second side 38*b*, the fourth side 38*d* of the flatten plate comprises a second angular edge 56 which commences at a point 58 substantially positioned along the fourth side and across from the aperture 40 of the latch mechanism and terminates at the third side 38*c* to form a protruding member 60 having one side 62 in common with that of the cutout 52.

Figure 7:
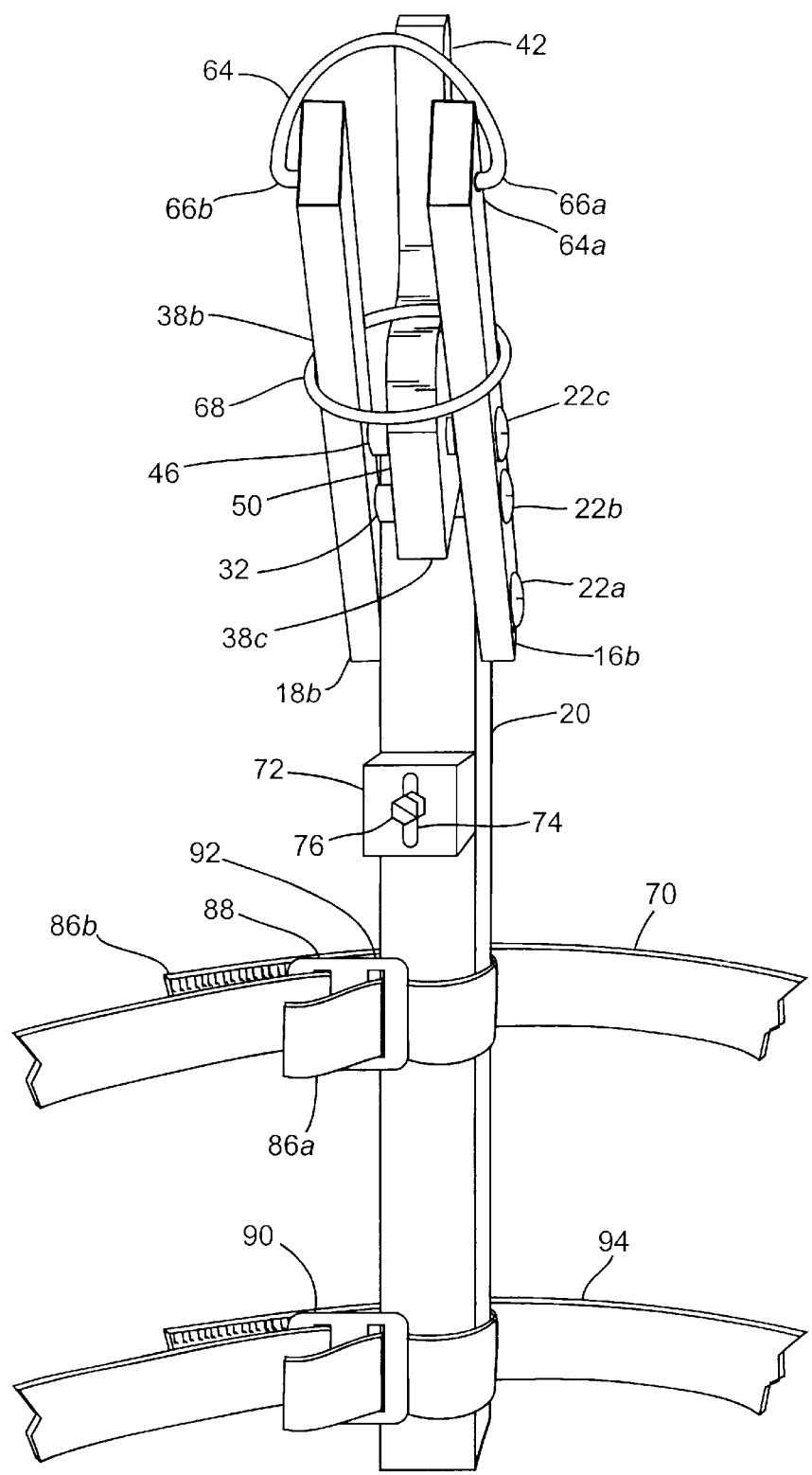
FIG. 7 is a front perspective view of the preferred embodiment of the present invention illustrating a fork support assembly in an upright position and engaging a top end of a vertical support member.

As means for handling the support fork assembly to ease lifting of the utensil cover from an at-rest position atop the cooking and food serving utensil, the elongate arms 16, 18 are adaptably fitted with a D-shaped ring 64 having two inwardly protruding ends 64*a*, 64*b*. Each protruding end is slidably situated in a depression 66*a*, 66*b* extending inwardly partway into each elongate arm to permit pivotal movement of the D-shaped ring thereabout. As depicted in FIG. 7, each depression is preferably located near the first end 16*a*, 18*a* of the elongate arm which suitably places the D-shaped ring in a position to gain the maximum amount of leverage needed to sufficiently lift the cover and place it in a supporting incline position. In addition to the presence of the D-shaped ring, the support fork assembly 12 further comprises an o-ring 68 slidably positioned onto the elongate arms extending parallel to one another while in an assembled state. The o-ring, which is configurably situated in between the D-shaped ring 64 and the tertiary aperture 16*e*, 18*e*, suitably allows the upwardly extending handle of the utensil cover to engage therewith and prevent downward sliding movement thereof as the support fork assembly is upwardly lifted from a horizontal position.

Figure 8:
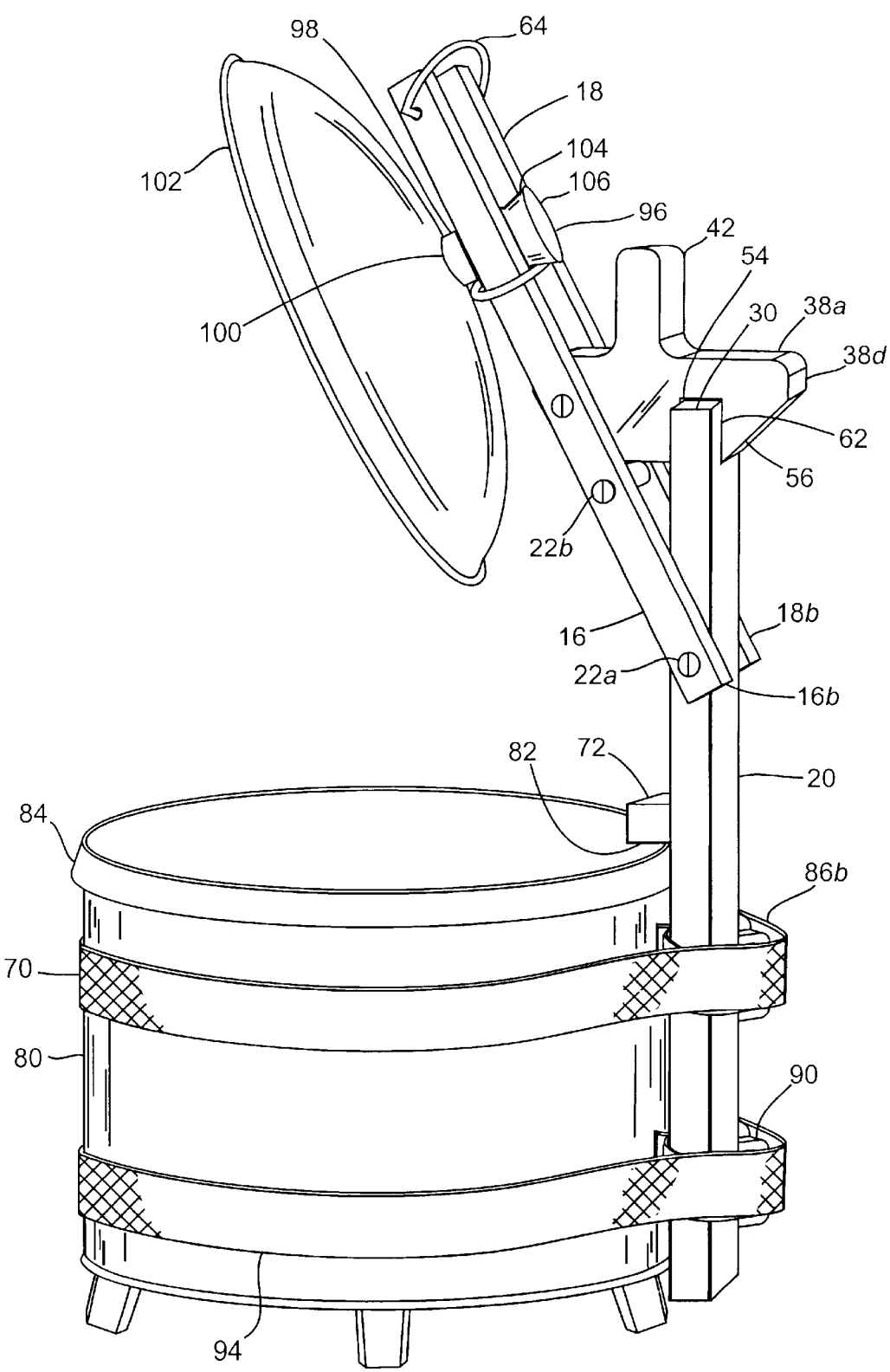
FIG. 8 is a perspective view of the preferred embodiment of the present invention illustrating a pair of straps circumferentially engaging a cooking and food serving utensil and supporting a cover in an upright, incline orientation.

Referring now to FIG. 8, the vertical support member 20 further comprises means for attaching the utensil cover lift and support apparatus 10 to the cooking and food serving utensil insofar to accommodate the objectives stated herein, namely lifting and supporting the cover without direct contact therewith. Preferably, attaching means comprises at least one strap 70 and an adjustable support block 72, both of which being adaptably configured to allow the vertical support member 20 to engage and make contact with structural features of the cooking and food serving utensil. The adjustable support block 72 principally serves as means to prevent the vertical support member from slipping downwardly as the support fork assembly 12 lifts and supports the cover of the cooking and food serving utensil. In order to accommodate the geometric configuration of the cooking and food serving utensil, most notably relating to the height thereof, the adjustable support block 72 comprises means for adjustment about the vertical support member, namely a slot 74 extending lengthwise thereabout and a screw 76 threadably fitted therethrough to adaptably affix the support block to the vertical support member 20 at a predetermined location. Preferably, the support block is fastened to an inner facing side 78 of the vertical support member, specifically being mounted in such a fashion to extend inwardly toward the centroid of the cooking and food serving utensil. Once the vertical support member is positionally placed near a sidewall 80 of the cooking and food serving utensil insofar to allow a bottom portion 82 of the support block 72 to engage an outer lip 84 extending circumferentially about the cooking and food serving utensil, the utensil cover lift and support apparatus 10 is prevented from moving downwardly along the longitudinal axis of the vertical support member. As shown in FIG. 8, the strap equally serves to secure the vertical support member 20 to the cooking and food serving utensil, most notably in preventing outward lateral movement of the utensil cover lift and support apparatus 10 from the sidewall 80 of the cooking and food serving utensil. Preferably, the strap 70 comprises first and second ends 86*a*, 86*b* and is made from a continuous piece of material comprising VELCRO® to provide ready means for engaging the vertical support member 20 to the sidewall 80 of the cooking and food serving utensil. Although not expressly stated herein, other devices known in the art for securing the vertical support member to the sidewall are equally noted, providing such device possesses favorable properties of flexibility and strength without suffering permanent deformation after sustained use thereof. As illustrated in FIG. 7, the first end 86*a* of the strap 70 is slidably fitted through a slot 88 of a buckle 90 and extended therebeyond a predetermined distance to wrap around a portion of the vertical support member 20, after which the first end 86*a* is slidably positioned through a second slot 92 of the buckle, collectively serving to lock and secure the first end of the strap about the vertical support member. Through this arrangement, the strap 70 is permitted to slidably move up-and-down along the length of the vertical support member 20 insofar to accommodate differing sidewall heights of the cooking and food serving utensil. After securing the first end 86*a* to the vertical support member, the strap is then circumferentially positioned and movably placed about the cooking and food serving utensil until the second end 86*b* affixed with VELCRO® is in reach of the first end 86*a*. Final securing of the strap to the vertical support member and about the cooking and food serving utensil occurs as the second end is positionally placed over a portion of the strap affixed with VELCRO® to permit engagement therewith, as shown in FIGS. 7 and 8. In alternative arrangements, one in which accommodates a larger than normal cooking and food serving utensil, the vertical support member may be fitted with a second strap 94 of similar design and comprise equivalent attaching means as the first strap 70, with each of the straps being circumferentially fitted to and spatially placed apart along and about the sidewall 80 of the cooking and food serving utensil, as shown in FIG. 8.

In operation, the utensil cover lift and support apparatus 10 is first configurably prepared for mounting on the cooking and food serving utensil. As illustrated in FIGS. 4 and 6, the latch mechanism 14 is cocked forward insofar to disengage the cutout 52 from and top end 30 and clear the vertical support member 20, while the first and second ends 86*a*, 86*b* of the strap 70 are selectively disengaged from one another. The support fork assembly 12 is then upwardly lifted and moved inward to allow the elongate arms 16, 18 to slidably engage a portion of an upwardly extending handle assembly 96 generally made part of the cooking and food serving utensil's cover. It is noted herein that the utensil cover lift and support apparatus 10 is suitably dedicated for use with a handle assembly 96 comprising a shaft 98 having a first end 100 fixedly connected to the utensil cover and a second end 102 having an integral shaped bun 104 of larger geometric proportions than the first end. This geometric configuration is one in which allows the elongate arms 16, 18 to engage the handle for secure lifting and supporting of the cover from and over the cooking and food serving utensil. After engaging the handle with that of the support fork assembly insofar that the handle is extendingly situated in between the two elongate arms, the vertical support member 20 is downwardly cocked toward the sidewall 80 of the cooking and food serving utensil until which time the utensil cover's handle 96 is further slidably positioned within the elongate arms 16, 18 and the vertical support member contacts the sidewall. The strap 70 is then fittingly secured to the sidewall of the cooking and food serving utensil in the manner described hereinbefore. Once the utensil cover lift and support apparatus 10 is tighteningly secured to the cooking and food serving utensil, the utensil cover can now be safely lifted by grabbing onto the D-shaped ring swingably affixed near the first end of the elongate arms and lifting upwardly therewith, as noted in FIG. 4 along path M, until the latch mechanism 14 is within vicinity of the vertical support member. The cutout 52 is then configurably positioned atop the vertical support member 20 to permit the abutting end 54 to mate and engage with the top end 30 thereof.

It can be seen from the foregoing that there is provided in accordance with this invention a simple and easily operated device, which is particularly suitable for lifting and supporting a cover generally made part of the cooking and food serving utensil. The utensil cover lift and support apparatus 10 is completely functional in a variety of food preparation and service settings where periodic access to the comestible contents residing within the cooking and food serving utensil is required to complete tasks of food preparation and service and where space is limited for situating the cover nearby. It is obvious that the components comprising the utensil cover lift and support apparatus 10 may be fabricated from a variety of materials, providing such selection or use of materials possess the capacity to withstand forces acting thereon throughout its duration of use in a food preparation and service setting and withstand a moderate elevated temperature generally encountered during food preparation. Accordingly, it is most desirable, and therefore preferred, to construct the support fork assembly 12 and vertical support member 20 from a rigid material such as acrylic, Teflon , nylon or polycarbonate, to name a few most readily available in the art.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. An apparatus for lifting and supporting a cover having a handle extending upwardly therefrom and being geometrically configured to fit atop a cooking utensil having an outer lip extending circumferentially thereabout, said apparatus comprising in combination:

a vertical support member having a top end and an adjustable support block slidably connected thereto, below said top end for engaging a portion of the outer lip;

means for securing said vertical support member to the cooking utensil; and a support fork assembly having a pair of elongate arms for engaging therewithin the upwardly extending handle, each of which having an end pivotally attached to said vertical support member, and a latch mechanism situated in between and pivotally attached to said elongate arms collectively allowing said support fork assembly to pivot about said vertical support member to selectively hold the cover at an incline position.

2. An apparatus as set forth in claim 1, wherein said adjustable support block comprises a slot extending longitudinally thereabout for receiving a screw threadably engaged to an inner facing side of said vertical support member insofar to allow said adjustable support block to move upwardly and downwardly thereabout to accommodate varying heights of the cooking utensil.

3. An apparatus as set forth in claim 1, wherein said securing means comprises a strap circumferentially positioned about the cooking utensil and having a first end adaptably connected to said vertical support member and a second end overlapping in vicinity of said first end and securely mating with a portion of said strap to tighteningly hold said vertical support member to the cooking utensil.

4. An apparatus as set forth in claim 1, wherein said securing means comprises a pair of straps each being circumferentially positioned about the cooking utensil and having a first end adaptably connected to said vertical support member and a second end overlapping in vicinity of said first end and securely mating with a portion of said strap to tighteningly hold said vertical support member to the cooking utensil.

5. An apparatus as set forth in claim 3, wherein securing means further comprises a buckle having a first slot extending therethrough for slidably receiving said first end of said strap, said first end extending beyond said first slot a predetermined length to wrap around said vertical support member and slidably pass through a second slot of said buckle to tighteningly hold said first end to said vertical support member.

6. An apparatus as set forth in claim 1, wherein each of said elongate arms comprises primary, secondary and tertiary apertures extending therethrough for receiving a corresponding number of fasteners to steadily hold together said elongate arms in a parallel orientation.

7. An apparatus as set forth in claim 6, wherein said support fork assembly further comprises an arm spacer having a bore extending longitudinally thereabout configurably aligned with said secondary aperture of each of said elongate arms to slidably accept therethrough said fastener.

8. An apparatus as set forth in claim 6, wherein said support fork assembly further comprises a pair of latch spacers each having an elongate bore extending therethrough and selectively positioned perpendicular in between said elongate arm and said latch mechanism and configurably aligned with said tertiary aperture of said elongate arm and an aperture extending through said latch mechanism to allow pivotal movement thereabout.

9. An apparatus as set forth in claim 1, wherein said latch mechanism comprises a flatten plate having an aperture extending therethrough and first, second, third and fourth sides, said first side comprising a handle extending outwardly therefrom, perpendicular thereto for assisting in engaging and disengaging said latch mechanism to and from said top end of said vertical support member, said second side comprising an angular edge commencing near said aperture of said plate and terminating at said third side to provide unhindered movement of said latch mechanism, said third side comprising a cutout having an abutting end and a geometric configuration substantially equivalent to said top end of said vertical support member, said forth side comprising a second angular edge commencing at a point substantially transverse from said aperture of said latch mechanism and terminating at said third side to form a protruding member having one side in common with that of said cutout.

10. An apparatus as set forth in claim 1, wherein said support fork assembly further comprises an o-ring slidably fitted onto said elongate arms and configurably situated in between a first end of said elongate arm and said latch mechanism suitably serving as means to engage the upwardly extending handle and prevent downward sliding movement of the utensil cover as said support fork assembly is upwardly lifted and selectively situated at an incline position.

11. An apparatus as set forth in claim 1, wherein each of said elongate arms comprises a depression extending inwardly partway near a first end thereof and a D-shaped ring having two inwardly protruding ends each being situated within said depression, said D-shaped ring being suitably placed in a position to gain the maximum amount of leverage needed to lift said support fork assembly with ease from an at-rest position.

12. A method for lifting and supporting a cover having a handle extending upwardly therefrom and being geometrically configured to fit atop a cooking utensil having an outer lip extending circumferentially thereabout, said method comprising the steps of:

situating a vertical support member alongside the cooking utensil, said vertical support member having a top end and an adjustable support block slidably affixed thereto, below said top end for engaging a portion of the outer lip;

positioning a strap circumferentially about the cooking utensil, said strap having a first end adaptably fitted to said vertical support member and a second end overlapping in vicinity of said first end and mating with a portion of said strap to tighteningly hold said vertical support member to the cooking utensil;

connecting a pair of elongate arms to said vertical support member and situating in between said elongate arms and pivotally attaching thereto a latch mechanism having means for engaging said top end of said vertical support member; and fitting within said elongate arms the upwardly extending handle and lifting upwardly therewith until engaging means is in vicinity of said top end and secured to said vertical support member.

13. A method as set forth in claim 12, wherein said engaging means comprises a cutout formed from out of a third side of said latch mechanism and having an abutting end and a geometric configuration substantially equivalent to said top end of said vertical support member.

14. A method as set forth in claim 12, wherein each of said elongate arms comprises a depression extending inwardly partway near a first end thereof and a D-shaped ring having two inwardly protruding ends each being situated within said depression, said D-shaped ring being suitably placed in a position to gain the maximum amount of leverage needed to lift said support fork assembly with ease from an at-rest position, said elongate arms further comprising an o-ring slidably fitted thereon and configurably situated in between a first end of said elongate arm and said latch mechanism suitably serving as means to engage the upwardly extending handle and prevent downward sliding movement of the utensil cover as said support fork assembly is upwardly lifted and situated at an incline position.

15. An apparatus for lifting and supporting a cover having a handle extending upwardly therefrom and being geometrically configured to fit atop a cooking utensil having an outer lip extending circumferentially thereabout, said apparatus comprising in combination:

a vertical support member having a top end and an adjustable support block slidably affixed thereto, below said top end for engaging a portion of the outer lip;

a pair of straps each being circumferentially positioned about the cooking utensil and having a first end adaptably fitted to said vertical support member and a second end overlapping in vicinity of said first end and securely mating with a portion of said strap to tighteningly hold said vertical support member to the cooking utensil;

a support fork assembly having a pair of elongate arms for engaging therewithin the upwardly extending handle, each of which having an end pivotally attached to said vertical support member, and a latch mechanism situated in between and pivotally attached to said elongate arms collectively allowing said support fork assembly to pivot about said vertical support member to selectively hold the cover at an incline position; and an o-ring slidably fitted onto said elongate arms and configurably situated in between a first end of said elongate arm and said latch mechanism suitably serving as means to engage the upwardly extending handle and prevent downward sliding movement of the utensil cover as said support fork assembly is upwardly lifted and selectively situated at an incline position.

16. An apparatus as set forth in claim 15, wherein each of said elongate arms comprises a depression extending inwardly partway near a first end thereof and a D-shaped ring having two inwardly protruding ends each being situated within said depression, said D-shaped ring being suitably placed in a position to gain the maximum amount of leverage needed to lift said support fork assembly with ease from a static position.

17. An apparatus as set forth in claim 15, wherein said latch mechanism comprises a flatten plate having an aperture extending therethrough and first, second, third and fourth sides, said first side comprising a handle extending outwardly therefrom, perpendicular thereto for assisting in engaging and disengaging said latch mechanism to and from said top end of said vertical support member, said second side comprising an angular edge commencing near said aperture of said flatten plate and terminating at said third side to provide unhindered movement of said latch mechanism, said third side comprising a cutout having an abutting end and a geometric configuration substantially equivalent to said top end of said vertical support member, said forth side comprising a second angular edge commencing at a point substantially transverse from said aperture of latch mechanism and terminating at said third side to form a protruding member having one side in common with that of said cutout.

18. An apparatus as set forth in claim 15, wherein each of said elongate arms comprises primary, secondary and tertiary apertures extending therethrough for receiving a corresponding number of fasteners to steadily hold together said elongate arms in a parallel relation.

19. An apparatus as set forth in claim 18, wherein said support fork assembly further comprises an arm spacer having a bore extending longitudinally thereabout configurably aligned with said secondary aperture of each of said elongate arms to slidably accept therethrough said fastener.

20. An apparatus as set forth in claim 18, wherein said support fork assembly further comprises a pair of latch spacers each having an elongate bore extending therethrough and suitably positioned perpendicular in between said elongate arm and said latch mechanism and configurably aligned with said tertiary aperture of elongate arm and an aperture extending through said latch mechanism to allow pivotal movement thereabout.

* * * * *